United States Patent [19]

MacArthur et al.

[11] Patent Number: 5,187,370
[45] Date of Patent: Feb. 16, 1993

[54] ALTERNATING CURRENT LONG RANGE ALPHA PARTICLE DETECTOR

[75] Inventors: Duncan W. MacArthur; James L. McAtee, both of Los Alamos, N. Mex.

[73] Assignee: University of California, Alameda, Calif.

[21] Appl. No.: 799,464

[22] Filed: Nov. 27, 1991

[51] Int. Cl.$^5$ .............................................. G01T 1/185
[52] U.S. Cl. .................................. 250/379; 250/374; 250/380
[58] Field of Search ............... 250/374, 375, 379, 380, 250/382, 384, 385.1, 388, 381

[56] References Cited

U.S. PATENT DOCUMENTS 2,502,617  4/1950  Fearon ................................ 250/379
5,003,176  3/1991  Tanaka et al. ...................... 250/374

*Primary Examiner*—Constantine Hannaher
*Assistant Examiner*—Edward J. Glick
*Attorney, Agent, or Firm*—Milton D. Wyrick

[57] ABSTRACT

An alpha particle detector, utilizing alternating currents, whcih is capable of detecting alpha particles from distinct sources. The use of alternating currents allows use of simpler ac circuits which, in turn, are not susceptible to dc error components. It also allows the benefit of gas gain, if desired. In the invention, a voltage source creates an electric field between two conductive grids, and between the grids and a conductive enclosure. Air containing air ions created by collision with alpha particles is drawn into the enclosure and detected. In some embodiments, the air flow into the enclosure is interrupted, creating an alternating flow of ions. In another embodiment, a modulated voltage is applied to the grid, also modulating the detection of ions.

9 Claims, 3 Drawing Sheets

ALTERNATING CURRENT LONG RANGE ALPHA PARTICLE DETECTOR

The invention is a result of a contract with the Department of Energy (Contract No. W-7405-ENG-36).

BACKGROUND OF THE INVENTION

The present invention generally relates to alpha particle detectors, and, more specifically, to detectors capable of detecting alpha particles originating from a point distant from the detector and utilizing alternating currents.

In any area where radioactive materials are handled, it is imperative, both for the protection of personnel and to avoid contamination of the environment, to continuously monitor personnel, equipment, and clothing to prevent the release of radioactive contamination. Alpha contaminants, such as plutonium, are particularly difficult to detect because of the limited penetration of alpha particles in air. Alpha particles from typical contaminants travel no more than one inch in air. It is because of this characteristic that prior alpha detectors have been useful only when used in close proximity to the point of possible emission. Currently, alpha contamination cannot be detected if it originates in a space that is too small for insertion of a conventional monitor. Prior detectors have normally been employed in personnel screening when moved slowly in close proximity to a person's body. Workers in nuclear processing facilities must place their hands and feet on sensors when moving from room to room. All of this can slow operations, as it is not currently possible to adequately screen personnel within a reasonable period of time.

It is also extremely difficult to monitor equipment for alpha contamination, again due to the limited range of alpha particles in air. Because of the monitoring difficulty, equipment that has been used in a potentially contaminated area is often classified as potentially contaminated and its further use is restricted to other controlled areas. If such equipment could be effectively monitored for contamination, the equipment could be released for use in uncontrolled areas. Previously, contamination inside assemblies has been impossible to detect without dismantling the assembly. The present invention allows contamination detection in any area that air can penetrate.

As used herein, the terms "long range," or "long distance," when referring to the detection capabilities of the present invention, shall mean detection from a range or distance of more than one (1) inch from the source of alpha radiation.

In the past, several instrument designs have been utilized to detect alpha radiation. Among these are GM tubes, ionization chambers, count rate detectors, and scintillation or gas flow proportional probes. While these instruments are capable of detecting alpha particles, they do so by directly detecting incident radiation, and must be within an inch of the source of the radiation. Also, these conventional alpha particle detectors can only scan an area approximately equal to the size of the detector.

The primary reason for an alpha particle's short flight path in air is its collision with air molecules. In almost all of these collisions, air ions are created which will have a longer life and area of influence than the alpha particles that created them. It is these ions that are detected by the present invention. The fact that the air ions have a longer range than the alpha particles relieves the necessity for having a detector moved over a person or equipment in order to detect the presence of alpha radiation.

In a copending application, Ser. No. 709,566, filed Jun. 3, 1991, a long range alpha detector is disclosed in which at least two grids are utilized. Another copending application, Ser. No. 07/773,002, filed Oct. 8, 1992, discloses single and double grid long range alpha detectors. The present application provides alternating current long range alpha detector. Both of these copending applications involve direct current detectors, that is, the flow of ions into the detector is continuous, and results in a direct current which must be amplified and measured. The use of alternating currents in the present invention allows the use of simpler and less expensive ac amplifiers, and avoids many dc error components. It is therefore an object of the present invention to provide apparatus for the long range detection of alpha particles utilizing an alternating current flow of ions to the detector.

It is another object of the present invention to provide apparatus for the long range detection of alpha particles providing an alternating current voltage to the grids.

It is another object of the present invention to provide apparatus for the long range detection of alpha particles which is less susceptible to error components than are dc detectors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises an alternating current alpha particle detector that operates by detecting air ions created by collisions with alpha particles comprising an electrically conductive enclosure defining first and second openings for admitting and exhausting air, with first and second electrically conductive grids insulatively mounted and spaced apart within the enclosure. Means for generating an electrical voltage, having one terminal connected to the second electrically conductive grid and its other terminal connected to the electrically conductive enclosure, create an electric field in the space between the first and second electrically conductive grids as well as between the first and second electrically conductive grids and said electrically conductive enclosure. Fan means are mounted outside the enclosure adjacent to the second opening for drawing air containing the air ions through the first opening in the enclosure and into the space between the first and second electrically conductive grids. Ion interrupt means are located outside of the conductive enclosure and near the first opening for intermittently interrupting and passing the air ions through the first opening. Detecting means are connected to the first electrically conductive grid for indicating an alternating current through the first electrically conductive grid produced by said air ions.

In a further aspect of the present invention, and in accordance with its objects and purposes, an alternating current alpha particle detector that operates by detecting air ions created by collisions with alpha particles comprises an electrically conductive enclosure defining first and second openings for admitting and exhausting air, with first and second electrically conductive grids insulatively mounted and spaced apart within the enclosure. Means for generating a modulated electrical voltage, having one terminal connected to the first electrically conductive grid and its other terminal connected to the electrically conductive enclosure, create a modulated electric field in the space between the first and second electrically conductive grids as well as between the first and second electrically conductive grids and the electrically conductive enclosure. Fan means are mounted outside the enclosure adjacent to the second opening for drawing air containing the air ions through the first opening in the enclosure and into the space between the first and second electrically conductive grids. And detecting means are connected to the first electrically conductive grid for indicating an alternating current through the first electrically conductive grid produced by the air ions.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
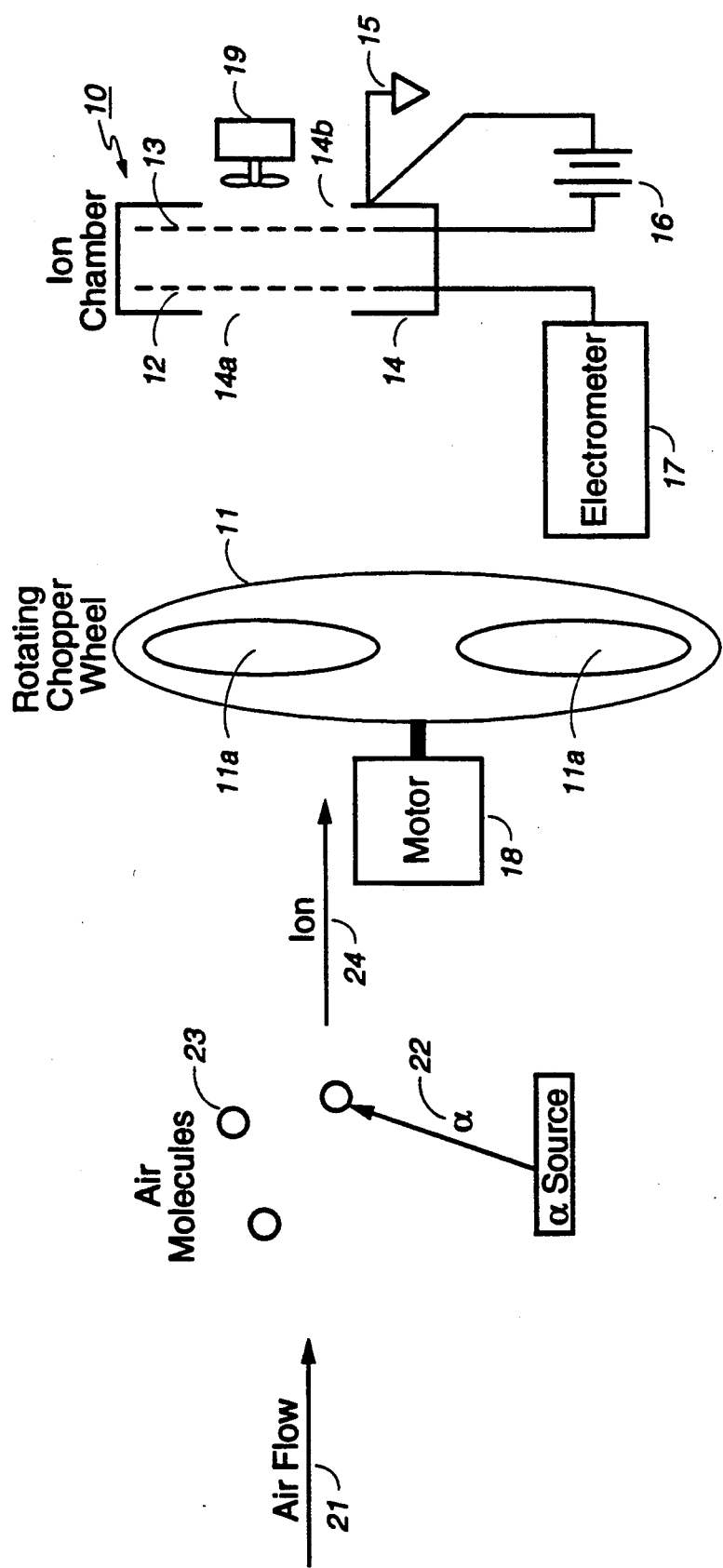
FIG. 1 is a schematic diagram of an embodiment of the present invention in which the flow of air ions to the detector is modulated through use of a mechanical chopper.

The present invention can be most easily understood by reference to the Figures. In FIG. 1, a schematic diagram of one embodiment of the present invention, ion chamber 10 is shown. Ion chamber 10 is a long range alpha particle detector employing dual electrically conductive grids as are disclosed in our copending application, Ser. No. 709,566. The grids may be wires held in place by a frame. Basically, ion chamber 10 comprises conductive signal grid 12, and conductive voltage grid 13, which are insulatively mounted within conductive enclosure 14. Conductive enclosure defines ports 14a and 14b, and is grounded through ground 15. Conductive voltage grid 13 is connected to voltage source 16, which is also grounded through ground 15. In one case, conductive signal grid 12 is connected to electrometer 17 which monitors the current through conductive signal grid 12. Fan 19 draws airflow 21 through ports 14a and 14b.

At a position outside ion chamber 10, but near port 14a, an ion interrupt means comprising motor 18 and rotating chopper wheel 11 are mounted Here, airflow 21, created by fan 19, carries ions 24, created by alpha particles 22 colliding with air molecules 23, toward rotating chopper wheel 11, which is being rotated by motor 18. Rotating chopper wheel 11 defines apertures 11a, which admit ions 24 when in their path, but blocks the flow when not in their path. This alternating flow of ions 24 arrives at grid 12 in detector 10 in pulses, providing alternating current detection to electrometer 17.

Figure 2:
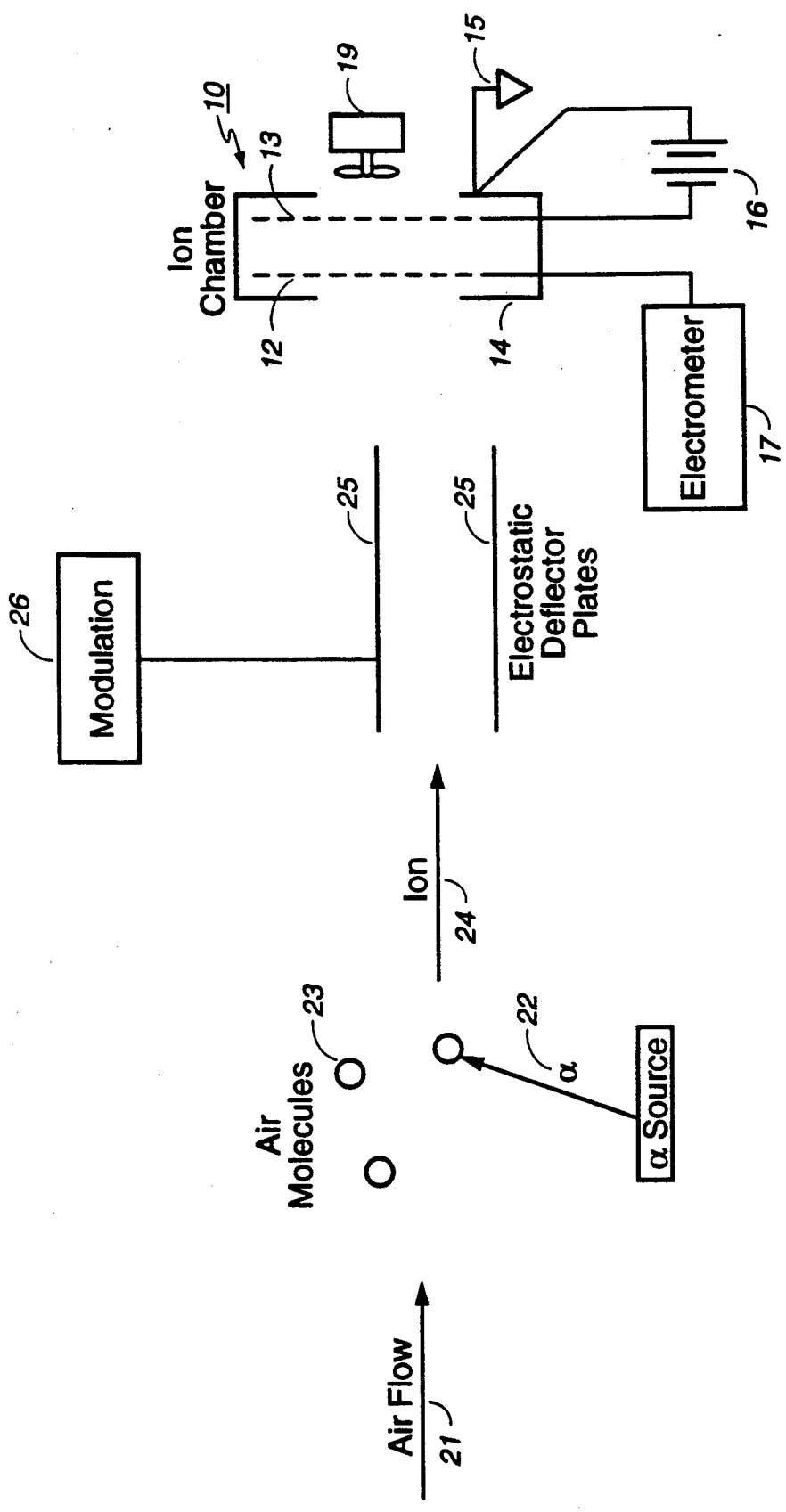
FIG. 2 is a schematic diagram of another embodiment of the present invention in which the flow of air ions to the detector is modulated through use of electrostatic deflector plates.

Another embodiment for ac detection is illustrated in FIG. 2. Here, ions 24, drawn by fan 19, must pass through another ion interrupt means, this time comprising electrostatic deflector plates 25, before being collected by grid 12 in detector 10. Electrostatic deflector plates 25 are connected to voltage modulator 26 which modulates the charged electrostatic deflector plates 25 into on-off states. Because of charge attraction, when plates 25 are on, ions 24 are diverted to one of plates 25 which is oppositely charged, and are collected. When plates 25 are off, that is, neutral, ions 24 continue unimpeded to grid 12. This method also produces pulses of ions 24, which produces an alternating current flow to electrometer 17.

Figure 3:
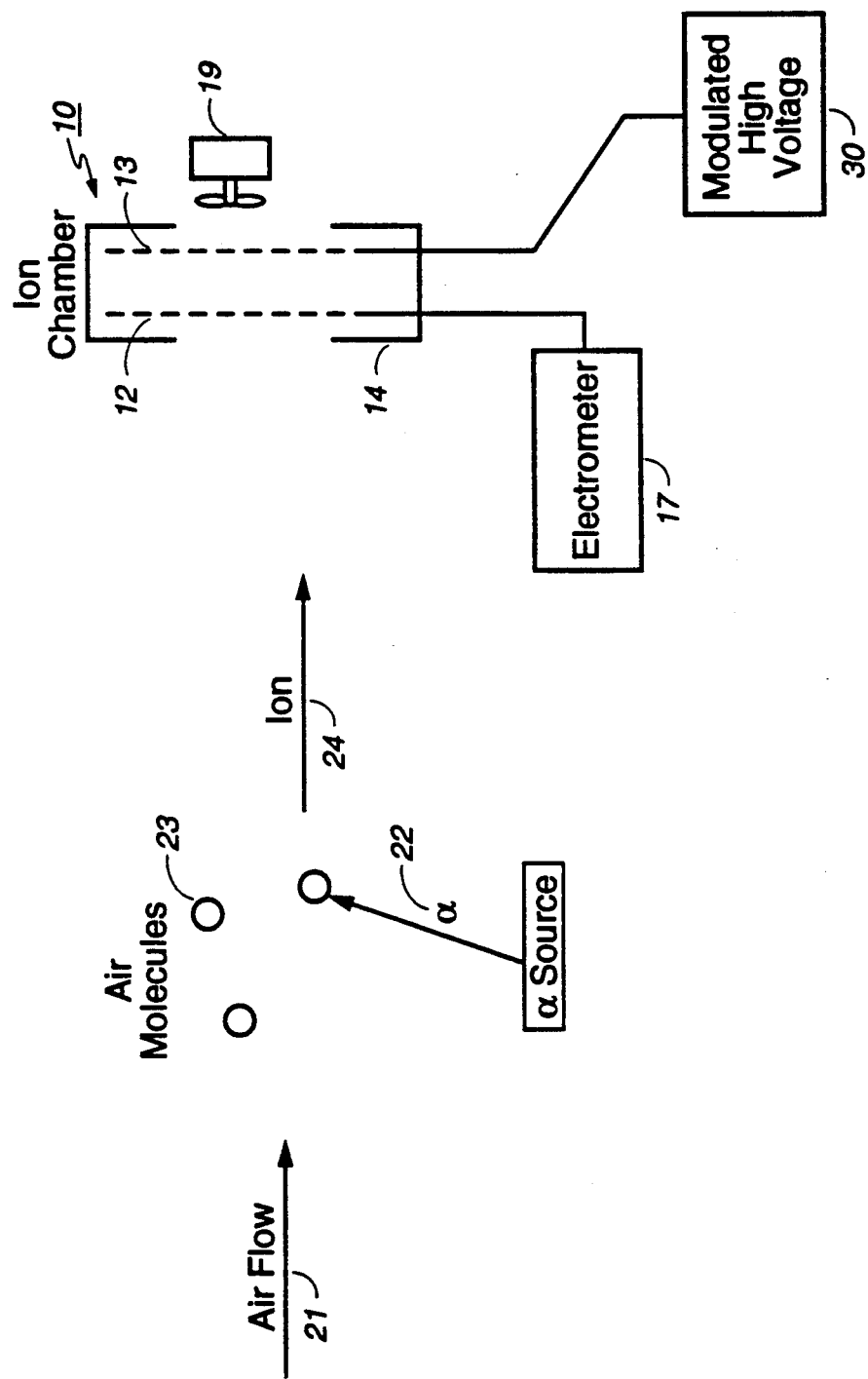
FIG. 3 is a schematic diagram of another embodiment of the present invention in which modulated high voltage is introduced within the ion chamber.

Still another alternating current embodiment is illustrated in FIG. 3, where voltage grid 13 is connected to modulated voltage supply 30. Modulated voltage supply 30 produces positive and negative voltages. When the voltage on voltage grid 13 is positive, positive ions 24 are collected by signal grid 12, and when negative, negative ions 24 are collected by signal grid 12. This results in a signal current from signal grid 12 which varies from positive to negative in an alternating manner, at the same frequency as the output of modulated voltage supply 30. The output of modulated voltage supply 30 can be any alternating polarity waveshape, such as sinusoidal, square, or triangular.

Alternating current detectors according to the present invention have several advantages over the direct current detector. One is that an alternating current signal will allow use of sensitive ac coupled amplifiers, rather than the dc coupled amplifiers of the long range alpha monitors disclosed in our copending application. This is important because many of the error components present in electronic amplifiers are dc, making an ac amplifier immune to these errors. An ac amplifier sensitive to the detected signal is simpler, and less expensive than a dc amplifier; this results in the electronics cost for an ac detector 10 less than for dc.

In all of the ac embodiments, the fact that ions 24 arrive at detector 10 in pulses means that a higher voltage could be applied, generating some gas gain. Gas gain, as used herein, means the extra ionized particles created by the energetic collisions of ions 24. These extra ions are also collected, increasing the signal current, and decreasing the electronic gain required of an amplifier, making the amplifier less complex. The voltage necessary to achieve gas gain is dependent on the geometry of detector 10, varying as the separation between charged conductors, signal grid 12 and voltage grid 13. In general, the necessary voltage for gas gain would be in the thousands of volts.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An alternating current alpha particle detector that operates by detecting air ions created by collisions with alpha particles comprising:

an electrically conductive enclosure defining first and second openings for admitting and exhausting air;

first and second electrically conductive grids insulatively mounted and spaced apart within said enclosure;

means for generating an electrical voltage, said electrical voltage having one terminal connected to said second electrically conductive grid and its other terminal connected to said electrically conductive enclosure, creating an electric field in said space between said first and second electrically conductive grids as well as between said first and second electrically conductive grids and said electrically conductive enclosure;

fan means mounted outside said enclosure adjacent to said second opening for drawing air containing said air ions through said first opening in said enclosure and into said space between said first and second electrically conductive grids;

ion interrupt means located outside of said conductive enclosure and near said first opening for intermittently interrupting and passing said air ions through said first opening; and detecting means connected to said first electrically conductive grid for indicating an alternating current through said first electrically conductive grid produced by said air ions.

2. The apparatus as described in claim 1 wherein said ion interrupt means comprises:

a disk defining one or more apertures for passing air ions; and rotation means for rotating said disk at a predetermined rate.

3. The apparatus as described in claim 1 wherein said ion interrupt means comprises:

a pair of spaced apart parallel electrically conductive plates; and modulated voltage supply means connected to said plates for alternately applying a voltage between said plates, and disconnecting said voltage.

4. The apparatus as described in claim 1 wherein said detecting means comprises an electrometer.

5. An alternating current alpha particle detector that operates by detecting air ions created by collisions with alpha particles comprising:

an electrically conductive enclosure defining first and second openings for admitting and exhausting air;

first and second electrically conductive grids insulatively mounted and spaced apart within said enclosure;

means for generating a modulated electrical voltage, said electrical voltage having one terminal connected to said second electrically conductive grid and its other terminal connected to said electrically conductive enclosure, creating a modulated electric field in said space between said first and second electrically conductive grids as well as between said first and second electrically conductive grids and said electrically conductive enclosure;

fan means mounted outside said enclosure adjacent to said second opening for drawing air containing said air ions through said first opening in said enclosure and into said space between said first and second electrically conductive grids; and detecting means connected to said first electrically conductive grid for indicating an alternating current through said first electrically conductive grid produced by said air ions.

6. The apparatus as described in claim 5, wherein said means for generating a modulated electrical voltage generates a sinusoidal voltage.

7. The apparatus as described in claim 5, wherein said means for generating a modulated electrical voltage generates a square wave voltage.

8. The apparatus as described in claim 5, wherein said means for generating a modulated electrical voltage generates a triangular wave voltage.

9. The apparatus as described in claim 5 wherein said detecting means comprises an electrometer.

* * * * *